June 12, 1951   A. K. KILANDER   2,557,032
METHOD FOR SEPARATING STARCH AND GLUTEN
Filed March 5, 1946   2 Sheets-Sheet 1

INVENTOR
Acton Keith Kilander
BY
Norman N. Holland
ATTORNEY

June 12, 1951  A. K. KILANDER  2,557,032
METHOD FOR SEPARATING STARCH AND GLUTEN
Filed March 5, 1946  2 Sheets-Sheet 2
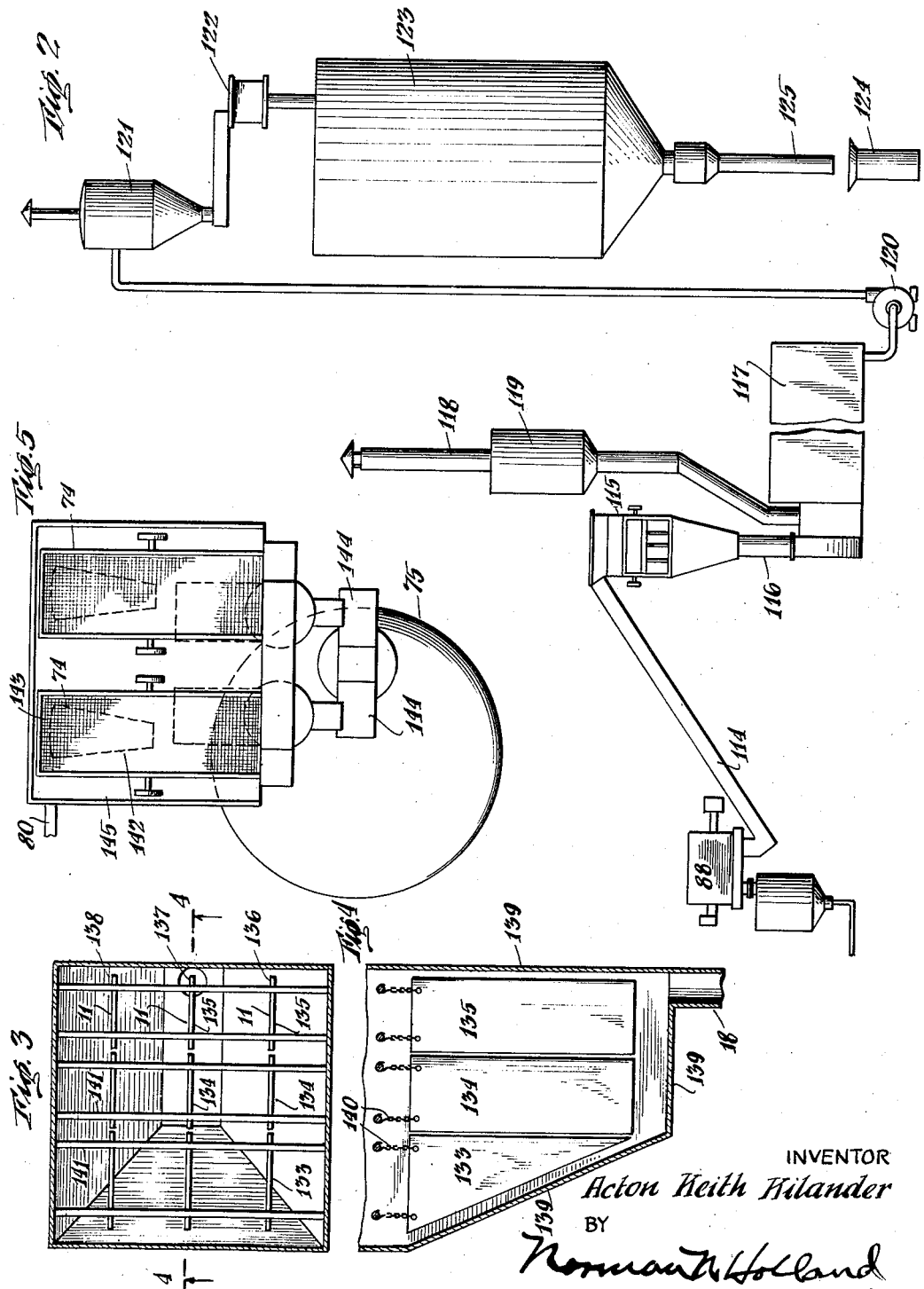
INVENTOR
Acton Keith Kilander
BY
Norman K. Holland
ATTORNEY Patented June 12, 1951

2,557,032

UNITED STATES PATENT OFFICE 2,557,032

METHOD FOR SEPARATING STARCH AND GLUTEN

Acton Keith Kilander, Gibraltar, Mich., assignor, by mesne assignments, to Trenton Chemical Company, Trenton, Mich., a corporation of Michigan Application March 5, 1946, Serial No. 652,140

5 Claims. (Cl. 99—50)

This invention relates to gluten separation and starch fermentation and is herein disclosed in some detail as embodied in a process and apparatus for separating gluten and starch from wheat flour; it is especially adapted for the more efficient recovery of gluten from durum wheat flour, and for more efficiently fermenting the separated starch.

In a prior patent application, Serial No. 530,228 filed April 8, 1944, now Patent No. 2,530,823, there has been disclosed an apparatus and process for the separation of starch and gluten from ordinary wheat flour. The present invention is herein illustrated in part as an improvement on that prior patent application and in part as a process in which new temperature control initiates conversion of the starch to sugar, if desired, thus providing a considerably converted starch for the process of preparing the material for the production of alcohol; it is also illustrated in part as an apparatus and process especially adapted for the separation and recovery of the gluten content of durum wheat flour.

It has long been known that durum wheats contain a larger proportion of gluten than do ordinary wheat flours and also are lower in price than many other wheat flours, but attempts to separate gluten from the flour of durum wheat proved failures commercially. Durum wheat flour, if agitated with water, made a paste instead of a dough when used in the same proportions that made a dough with ordinary wheat flour. Addition of further water to the durum wheat paste and then agitating failed to properly agglomerate the gluten in particles that could be satisfactorily screened out or satisfactorily separated from the starch water. Durum wheat flour is said to have inferior wettability compared with other wheat flour.

According to one form of the present invention these difficulties and objections encountered in recovering gluten from durum wheat flour are overcome and a larger yield of gluten is obtained at a lower cost; at the same time a highly useful starch water is separated suitable for fermentation or for the production of dry wheat starch. Moreover, the process may be so operated in using any wheat flour as to partially convert the contained starch to sugar ready for fermentation, and thus substantially reduce the time and materials needed for complete conversion to fermentable sugars.

In the form shown the durum wheat flour is admixed with ordinary wheat flour of the type hitherto used for the production of gluten, and the flour is then mixed with about an equal weight of water to form a dough and later agitated with added water to form gluten agglomerates which are screened out and then further agitated with added water and again screened. The water from this second screening preferably provides the added water for the first agitation.

The gluten from the second screen is then shown as delivered to hot devitalizing tanks and then dried.

In the form described in some detail, the durum wheat flour is mixed with about an equal weight of ordinary flour, since proportions of durum up to that amount or thereabouts give increasing yields of gluten and usually operate smoothly and efficiently in the process. If much larger proportions of the durum flour are added the yields of gluten are usually reduced, the dough becomes pasty and the mixture turns out to be difficult to put through the process shown.

It is found that the method of mixing the first dough exercises a considerable effect on the subsequent separation. Apparently the gluten is caused to agglutinate better if the screw-conveying mixer is interrupted so as to provide a pool where the mixture comes to rest and then is carried on by a second screw-conveyor. As many as three such pools prove useful in conveying the dough from the mixing sieve, where it is formed, to the agitator where it is agitated with added water and then the gluten screened out.

In order to operate the process with maximum efficiency the relative proportions of flour and water must be accurately controlled at various points, especially in the mixing to make the dough at the first step of the process, although the exact proportion of water to produce the best results may vary with the type of flour and with the temperature of working.

Also where the diverse types of flours are mixed as an incident to operating the process, varying the exact proportions of each used may seriously alter the efficiency of the process.

Thus it becomes important to assure an even feeding of the flour or flours used and to minimize or forestall any tendency of the flours to block by "bridging" within the feed bins or silos.

It has been found possible to minimize or eliminate the tendency to "bridge" by providing within the bins freely swinging baffle plates which extend from near the bottoms of the conical bottoms of the bins to a point above the conical wall. Such baffle plates are highly effective when set in several rows of separately swinging plates, and require no attention, and do not deteriorate or wear out.

It has been found possible to effectively dry the gluten by a process which includes delivering the oncoming wet gluten to a stream of previously dried gluten, sending part, perhaps half, of the mixed stream to a recirculating drier, and delivering the remainder of the mixed stream to a finishing drier.

Thus a continuously circulating stream of gluten is continually receiving wet gluten and is continually delivering part of the stream to be finally dried and shipped out as a finished product.

One of the objects of the present invention is to assure the even downward flow of flour in the feed bins by a simple device requiring no attention.

Another object of the invention is to increase the yield of gluten from wheat flour.

Another object of the invention is to provide a more economical and smoothly operating process for the production of gluten.

Another object of the invention is to produce an equally good gluten from lower priced flours.

Another object of the invention is to improve the agglomeration of the gluten to facilitate its separation.

Another object of the invention is to utilize simple steps to improve the agglomeration of the gluten.

Another object of the invention is to provide an improved drying procedure and apparatus for drying gluten.

Another object of the invention is to provide a process for recovering gluten from durum wheat flour.

Another object of the invention is to utilize natural enzymes of the wheat to initiate conversion of starch into sugars preparatory to fermentation.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 2 shows diagrammatically an alternative drying arrangement;

Fig. 3 is a sectional view looking down into one form of flow bin showing one form of anti-bridging baffle plates;

Fig. 4 is a sectional view along the line 4—4 of Fig. 3 showing a side view of the baffle plate structure; and Fig. 5 is a diagrammatic plan view of the second gluten screens showing them located over the devitalizing tank.

Figure 1:
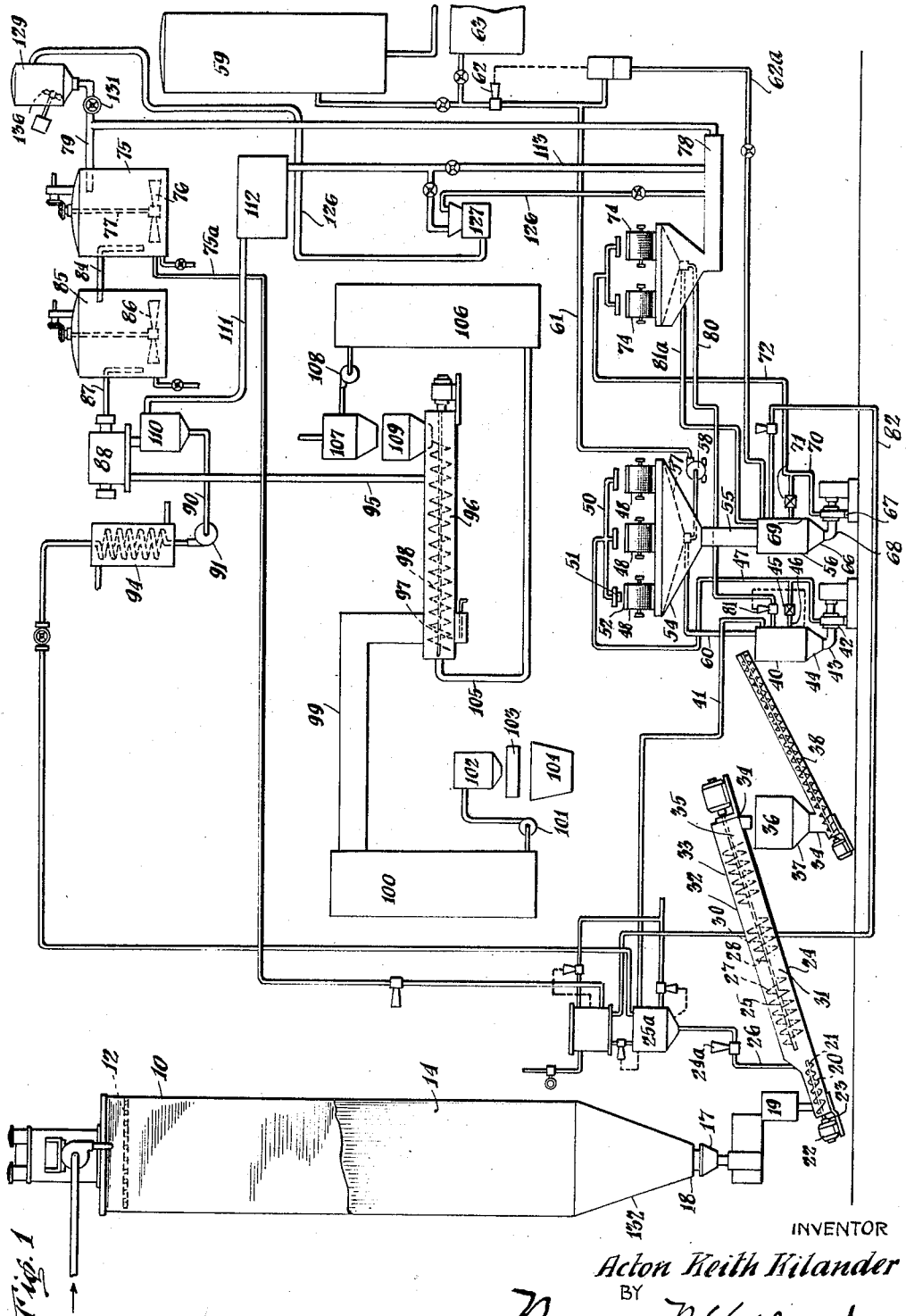
Fig. 1 is a flow sheet showing diagrammatically one form of apparatus suitable for carrying out the process, with some alternatives indicated.

In the form shown an ordinary type of wheat flour is stored in a bin 10 so that its flow may be controlled by baffles 11 (Fig. 3) as it flows into the bin through the usual steel grating 12 which has meshes about 1 inch by 2 inches to take out large waste elements.

In the form shown durum what flour is stored in a bin 14 located beside the bin 10 and which may be identical, having a grating and baffles 11.

Each of the bins 10 and 14 is preferably provided with a constant weight feeder 17 and a separate control valve 18 to enable independently measured quantities of each flour to be delivered to a sifter 19 where the two flours are carefully and thoroughly mixed before wetting and are sifted to take out lumps.

Imperfect mixing may cause difficulties. Usually the most efficient results are obtained when about equal parts of the durum and the ordinary wheat flour are mixed, but the quality of the flours used may alter proportions either way for best results.

A smaller proportion of the durum flour demands a larger proportion of the more expensive flour. A larger proportion of the durum flour usually yields an unsatisfactory dough and raises other problems in operating the process.

In the form shown the mixed flour drops into the small end of a tapered conveyor 20 having a pair of screw conveyors 21, one of which is shown in Fig. 1, adapted to be driven at a variable speed by a motor 22 connected by a suitable gearing 23.

The tapering of the conveyor 20 and the presence of the baffles 11 prevent or minimize bridging of the flour.

The tapered conveyor 20 delivers flour to a second screw conveyor 24 having flights 25 in the form shown, and preferably of eight inches diameter which is double the four inches of the conveyor 20.

The second conveyor 24, like the first conveyor 20, is shown as feeding the flour upwardly at an angle of about 30 degrees for a considerable distance to a point 27 where the turns or flights 25 of its screw terminate.

Water is added from a constant head tank 25a at about the end 26 of the tapered conveyor 20, usually hot water, hot enough to bring the resulting dough to a temperature of about 40° F. to 80° F. in instances where starch is desired as an end product, or to about 120° F. in instances where alcohol is to be made.

The amount of water fed is rather critical in its effect, depending a little on the flour used. Usually about a pound of water per pound of flour is most satisfactory, and the quantity of water added is easily automatically regulated at 24a within a half-gallon a minute which in the device shown was about 2% plus or minus. A variation of 10% in the proportions affects the final yield.

For about two feet beginning at the end 27 of the screw 25 the screw is shown broken away so that a sizable pool 31 of dough forms there and seems to let the gluten begin to agglutinate. At 28 about two feet from the point 27, new flights 30 of the screw 25 again feed the dough onwardly, preferably about half the distance it was fed by the flights 25, and then end to form a second pool 32 which may be somewhat shorter than the pool 31.

The screw includes further flights 33 which terminate short of the end 34 of the conveyor thus forming a third pool 35 where the dough pauses before its drops into a retention chamber 36. Here the dough is slowly, very slowly, agitated for a number of minutes by incoming and outgoing dough. Ten or fifteen minutes has been found useful. The chamber 36 also serves to provide storage for dough in case of interruption of operation of a conveyor 25 or of the washer 40, described below.

From the conical bottom 37 of the chamber 36, the dough is fed diagonally upward by a conveyor 38 which may be a screw or ribbon conveyor, and is dumped into a primary agitation tank or tall round washer 40 where water, preferably recovered water, is added from a hot water line 41 to make altogether about four pounds of water to one pound of flour.

The washer 40 is found most satisfactory if round and vertical, being shown half as high again as across. This shape facilitates circulation and breaking up of lumps, but not so violently as to break up the gluten agglomerates.

Agitation is satisfactory when a centrifugal pump 42 draws off the liquid through a bottom outlet 43 at the end of the conical bottom 44 and recirculates a large part of the pump feed through a Hills-McCanna valve 45 and return pipe 46 into the washer 40 somewhat below its middle, while the remainder of the pump feed is diverted by the valve 45 to a screen feed pipe 47 which delivers that part of the pump effluent to primary inclined vibrating screens 48, by distributing pipes 50.

In the form shown there are three screens 48 about three feet by four feet, each of two sections, preferably made of 30-mesh stainless steel wire cloth of diameter of 0.0135.

To avoid clogging, the distributing pipes 50 may be provided with plug cocks 51. Each screen receives the liquid by a spreader 52, and the distributed sheet of liquid is preferably received by a canvas baffle to keep the liquid mixture from impinging on the screen with sufficient violence to force gluten particles through the screen.

The gluten retained by the screens 48 rolls down them into a hopper 54 and chute 55 which delivers the separated-out gluten to a second agitation tank or washer 56.

Meanwhile the starch water passing through the screens 48 is gathered by a funnel 57 and pumped off as finished starch water by a pump 58 and delivered to a storage tank 59.

A return connection pipe 60 may return starch water to the washer 56 if need be to control the specific gravity of the starch water which is preferably about 1.073 to 1.084. The main current of the starch water may be carried by the line 61 from the pump 58 under the control of a liquid level control 62 and fed to the outside storage tank diagrammatically shown at 59, or it may go to a starch making plant at 63. The control 62 may return starch water to the circuit, shown as going through a valved pipe 62a which is shown as delivering to the washer 56, with the result that it eventually returns to the washer 40.

In the form disclosed in some detail the starch is eventually used for fermenting for the production of alcohol to be recovered by rectification.

To produce alcohol most efficiently the starch water in the tank 59 is preferably held at a temperature of 135° F. to 145° F., facilitating the action of natural enzymes of the wheat in changing starch to sugar, thus reducing the amount of malt required for subsequent fermentation.

When this result is sought, the temperature of the entire process, including the first and second washings, is preferably maintained at about 120° F. so that during all operations some of the starch is being changed into sugar. It is found that proper maintenance of such temperatures results in the changing of 15% to 25% of the starch into sugar. This enables the fermentation process to be economically operated by adjusting down to the lesser amount of starch to be treated by fermentation.

If the starch water is to be treated to yield pure dry starch, temperatures in the neighborhood of 90° F. to 105° F. are usually more satisfactory in the dough mixer and temperatures of 40° F. to 80° F. in the washers.

The second agitation tank or washer 56 may be identical with the washer 40 including a conical bottom 66 and a centrifugal pump 67 circulating the contents drawn through a pipe 68 at the bottom of the conical bottom and delivering the pumped and agitated contents to the side 69 of the washer 56, below its middle through a pipe 70 provided with a Hills-McCanna valve 71.

The valve 71 separates out part of the material in the pipe 70 diverting it to a pipe 72 which conveys the contents to secondary screens 74 which may be identical with the primary screens 48 including a spreader and a baffle although usually one screen 74 is needed where three screens 48, 49 are needed.

The gluten from the washer 56 is separated out on the screen 74, and drops down and is led into a Moyno pump 78 which forces the gluten through apertures in a pipe 79 into a steam-heated cylindrical devitalizing tank 75 where it is agitated by propeller blades 76 on a vertical shaft 77, at a temperature of about 190° F. to 212° F.

The apertures found satisfactory were ¼ inch to ½ inch in diameter, and the tank was of such a size that the gluten remained in it on an average of ten minutes plus another ten minutes when similarly treated in a second devitalizer 85, so that it is broken into suitable fragments, for the subsequent centrifuge, saw ¼ inch, but not very fine.

The propeller blades 76 are found to work best when in the form of helix curves in horizontal section and are rotated with their convex sides leading.

The water separated from the gluten at the screen 74 is shown as returned to the first washer 40 through a pipe 80 provided with a liquid level control 81. Any excess return water may be returned to the secondary washer 56 through a pipe 81a and fresh hot water may be added to the secondary washer 56 through a hot water main 82.

Under the conditions given the tackiness of gluten produced by insufficient devitalizing is avoided, and no further benefits seem to be obtained by devitalizer treatment beyond a total of twenty minutes.

The contents of the devitalizer 75 are shown as receiving fresh hot water from a main 75a and as drawn off from above the level of the propeller blades 76 through a pipe 84 which delivers the contents by gravity a little way down in the second similar devitalizer tank 85 provided with a similar propeller 86 and heated to the same temperature and delivering its contents, after an average period of ten minutes, through a pipe 87, similar to the pipe 84, to a continuous Bird centrifuge 88 in which the gluten (except the very fine particles equal to about 6% of the gluten) is separated from the accompanying water, reducing the moisture content to about 75%.

The water effluent from the centrifuge carrying this fine gluten is shown as carried back by a pipe 90 and pump 91 to the beginning of the process and used as hot water for mixing the initial dough at the tank 25a. For controlling the temperature of the return water, there is shown a cooling tank 94. The gluten recovered from the Bird centrifuge may be dried.

In the improved form shown herein, the gluten recovered in the Bird centrifuge 88 drops through conduit 95 on a conveyor, preferably a screw conveyor, diagrammatically shown at 96, which carries a load of previously dried gluten, thus mixing the two.

The load of mixed gluten is carried along past an opening diagrammatically indicated at 97, so that a part, usually about half, of the mixed gluten drops on a second conveyor 98 which carries it off for final drying.

To effect this final drying of the separated mixed gluten it is shown as carried by a third conveyor 99 to a rotary dryer 100, where the whole of the thus separated gluten is finally dried.

The dried gluten is diagrammatically shown as carried by a blower 101 to a cyclone separator 102 which is shown as delivering the dried gluten to a gluten bin 103 whence it passes at will to a bagger 104.

The mixed gluten which remains in the conveyor 96 is shown as separately dried to provide the stream of previously dried gluten. To provide this previously dried gluten the mixed gluten which passes the opening 97 is shown as delivered to a conveyor 105 which delivers the mixed gluten to a second rotary dryer 106 where the mixed gluten is dried.

This lot of the dried gluten is shown as delivered to a cyclone separator 107 by a blower 108, and then falling into a temporary bin 109 which delivers it to the conveyor 96 to provide the stream of previously dried gluten.

The opening 97 may be set to pass various desired proportions of gluten for final drying as conditions warrant.

The water required for feeding the gluten by the Moyno pump 78 may come from a tank 110 which temporarily receives water from the Bird centrifuge 88, through a pipe 111 which delivers the water to a constant level tank 112. The tank 112 is shown delivering the water by a valved pipe 113 to the pump 78.

In the alternative the gluten may be dried according to the procedure now to be described and illustrated in the accompanying drawing (Fig. 2).

In the alternate form shown (Fig. 2), the gluten recovered in the Bird centrifuge 88 drops into a conveyor 114 which carries it to a roller press 115. Such a press is found to remove one-fifth to one-third of the water in the gluten, reducing the water content of the wet mass to about 66%. If the gluten is still too sticky for efficient drying, a few per cent of previously dried gluten may now be added.

The pressed and partly dried gluten is shown as then fed by a chute 116 into the end of rotary steam tube drier 117 provided with an escape 118 for gases and steam, including a trap 119 for gluten carried in the gases.

A blower 120 is shown as blowing the dried gluten delivered from the drier 117 to a cyclone separator 121. The gluten is then shown as passing on from the cyclone 121 to an automatic weigher 122 and into a silo 123. A bagger 124 may receive gluten from a chute 125 at the bottom of the silo 123.

Another arrangement for handling the gluten which is more satisfactory under some conditions is to take the gluten from the screen 74 following the second agitation tank 56 and deliver it by a pipe 126 to an extruding device 127 of the meat grinder type and then delivering the strings of extruded gluten by gravity (diagrammatically shown by a pipe 128) to a hot water preliminary devitalizer 129.

Here the gluten is shown agitated by a small motor driven side entering propeller 130, and from this the gluten flows through the valve 131 to the devitalizer 75, and thence as if from the Moyno pump.

To avoid blocking of the downward feed of flow in the bins 10 and 14 by "bridging" of the flour as sometimes happens in the conical or funnel shaped bottom 132 (Fig. 1) of the bins, the bins are shown as provided with baffle 11 made up of freely swinging baffle plates 133, 134, 135, preferably of smooth metal. It has been found satisfactory to provide three rows 136, 137, 138 of baffle plates 133, 134, 135, each row consisting of three independently swinging plates 133, 134, 135.

In the form shown, the plates 133, 134, 135 are cut so as to swing clear of the bottom and side walls 139 of the bins 10 and 14, though close to the walls and are each hung by short chains 140, depending from cross bars 141. The cross bars may be set to hold the plates higher in the bin than a flour bridge would arch to.

As a result any bridge of flour that tends to form is cut by three smooth vertical surfaces so that flour slips down from between two of the surfaces, and when it slips down the plates swing in, the thrust ends of the incipient bridge collapse, and flour feeds down through the valve 18 unhindered.

The plan view of the screens 74 in Fig. 5, shows the vibrating screens 74, with the spreaders 142 above them delivering the gluten bearing liquid over end canvas baffles 143 to receive the shock of the on-coming stream, and collecting the gluten in chutes 144 for delivery to the devitalizer 74 below it.

The starch-bearing wash water is delivered to the pipe 60 by a funnel or tray 145 beneath its screens 74.

The various water and starch water conduits and pipes may include automatic temperature and level indicators and controls, only partially indicated to avoid complexity in the drawings.

The best results have been obtained when an anti-foaming agent was delivered to the first and secondary washers. Several agents have proved almost equally useful, such as di-butyl phthalate, octyl alcohol, "foamicide" of Wyandotte Chemical Corp. and "diafoam" made by Resinous Products Co. of Pittsburgh, Pa.

The operation of the plant shown may be summarized as follows: Flour and water are formed into a dough in the conveyor 24, the dough is admixed with more water in the agitator and washer 40.

The resulting suspension is flowed on to the screens 48 which screen out the gluten agglomerates from the starch water, and the latter is carried off by a pipe 61 to storage or fermentation.

The screened out gluten is further agitated in a washer 56, and screened out of the water on screens 74, converted into strings, and washed in hot water in the successive devitalizers 75 and 85, filtered in the filter 88 and carried to a drying system including the conveyor 96.

Here the on-coming wet gluten is admixed with previously dried gluten coming from a secondary drier 106, and part is carried to a final dryer 100, where the process may end with the gluten ready for packing.

It will be seen that a highly efficient method and apparatus are provided for the recovery of starch and gluten from wheat products which have proved so difficult to handle in the past, and the gluten is found to be purer than the gluten hitherto available commercially. Moreover by varying the process the starch may be recovered at will either as starch or as partially converted to sugar to facilitate subsequent fermentation. The gluten is shown as reduced to strings when freed from its associated starch, and thus well adapted to be quickly and efficiently dried.

In the form described excellent gluten is efficiently obtained from durum wheat, which is often richer in gluten than other wheats and at the same time is usually cheaper when sold as durum wheat flour.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In the process of producing gluten and alcohol from durum wheat the steps which comprise mixing durum wheat flour with about an equal amount of ordinary type wheat flour, admixing said mixed flours with water carrying some fine gluten particles to make a dough of about equal parts of water and flour, feeding and mixing the dough, further feeding the dough from a delay pool beyond said first feeding and mixing, again feeding the dough beyond a second delay pool, adding the dough to further water after a delay in a third delay pool, agitating the dough-water mixture to form agglomerates of gluten adapted to be retained on a thirty-mesh sieve, separating out the gluten by sieving the mixture and sending the separated starch water to fermentation and rectification.

2. The process of separating gluten from starch contained in durum wheat which comprises admixing durum wheat flour with ordinary type wheat flour having a higher percentage of starch so that the mixture contains about 50% of durum flour, making a dough of the mixed flour with an equal part of water, allowing the dough to stand in a quiet pool for a short interval, mixing the dough further, allowing the further mixed dough to stand in a quiet pool, mixing one part of the dough with four parts of added water, agitating the mixture by circulation to agglomerate contained gluten to form particles retainable on a 30-mesh sieve, and screening out the gluten agglomerates on a 30-mesh sieve.

3. In the process of producing gluten and alcohol from durum wheat the steps which comprise mixing durum wheat flour with about an equal amount of ordinary type wheat flour, admixing said mixed flours with water carrying some fine gluten particles to make a dough of about equal parts of water and flour, feeding and mixing the dough, further feeding the dough from a delay pool beyond said first feeding and mixing, again feeding the dough beyond a second delay pool, adding the dough to further water after a delay in a third delay pool, agitating the dough-water mixture to form agglomerates of gluten adapted to be retained on about a 30-mesh sieve, and separating out gluten agglomerates.

4. A process as claimed in claim 3, in which the temperature of the first mentioned added water is such as to give the dough a temperature of about 120° F.

5. The process of separating gluten from starch contained in durum wheat which comprises admixing durum wheat flour with ordinary type wheat flour so that the mixture contains about 50% of durum flour, making a dough of the mixed flour with about an equal part of water, allowing the dough to stand in a quiet pool for a short interval, thereafter mixing the dough, allowing the mixed dough to stand in a quiet pool, mixing about one part of the dough with about four parts of added water, circulating the mixture to agglomerate contained gluten to form particles retainable on about a 30-mesh sieve, and separating out said gluten particles.

ACTON KEITH KILANDER.

REFERENCES CITED

The following references are of record in the file of this patent:

UNITED STATES PATENTS

| Number | Name | Date |
|---|---|---|
| 340,705 | Duryea | Apr. 27, 1886 |
| 538,794 | Rockteschel | May 7, 1895 |
| 1,052,845 | Ponndorf | Feb. 11, 1913 |
| 1,535,811 | Briggs | Apr. 28, 1925 |
| 1,745,716 | Rynders | Feb. 4, 1930 |
| 1,845,847 | Reuther | Feb. 16, 1932 |
| 1,927,313 | Hagen et al. | Sept. 19, 1933 |
| 2,070,286 | Lissauer et al. | Feb. 9, 1937 |
| 2,090,187 | Credo | Aug. 17, 1937 |
| 2,144,333 | Hagen | Jan. 17, 1939 |
| 2,213,668 | Dundas et al. | Sept. 3, 1940 |
| 2,388,902 | Callaghan | Nov. 13, 1945 |
| 2,418,621 | Callaghan | Apr. 8, 1947 |

FOREIGN PATENTS

| Number | Country | Date |
|---|---|---|
| 107,603 | Australia | June 1, 1939 |

OTHER REFERENCES

Jour. Am. Chem. Soc., 35: 1635–1643 (1913).

Industrial and Engineering Chemistry, Feb. 1943, vol. 35, No. 2, pages 133 to 137, by Stark et al.

Osborne "The Vegetable Proteins," Longmans, Green and Co., London (1924), page 2.

Shewfelt et al., "Separation of Starch and Gluten from Wheat Flour," "Canadian Chemistry & Process Industries," July 1944, pages 502 and 519.